United States Patent [19]

Tsuchimura

[11] Patent Number: 5,799,303

[45] Date of Patent: *Aug. 25, 1998

[54] APPARATUS AND METHOD FOR SORTING ATTRIBUTES-MIXED CHARACTER STRINGS

[75] Inventor: Tadao Tsuchimura, Odawara, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 413,889

[22] Filed: Mar. 30, 1995

[30] Foreign Application Priority Data

Jun. 28, 1994 [JP] Japan .................. 6-145913

[51] Int. Cl.⁶ .................................................. G06F 17/30
[52] U.S. Cl. .................. 707/7; 707/7; 707/6; 395/898; 395/800
[58] Field of Search .................... 395/600, 700, 395/898; 364/300, 900; 707/7, 6

[56] References Cited

U.S. PATENT DOCUMENTS

| | | | |
|---|---|---|---|
| 4,210,961 | 7/1980 | Whitlow et al. | 364/300 |
| 4,295,206 | 10/1981 | Cain et al. | 364/900 |
| 4,611,280 | 9/1986 | Linderman | 364/300 |
| 4,760,526 | 7/1988 | Takeda et al. | 364/300 |
| 5,218,700 | 6/1993 | Beechick | 395/700 |
| 5,440,482 | 8/1995 | Davis | 364/419.13 |
| 5,615,366 | 3/1997 | Hansen | 395/607 |

FOREIGN PATENT DOCUMENTS

| | | |
|---|---|---|
| A-3-210627 | 9/1991 | Japan . |
| 6103028 | 4/1994 | Japan . |

Primary Examiner—Thomas G. Black
Assistant Examiner—Jean M. Corrielus
Attorney, Agent, or Firm—Staas & Halsey

[57] ABSTRACT

Character strings can be sorted according to the attributes of characters therein in an order suited to the significance of the characters. Dividing means divides character strings to be sorted in a database according to the attributes and creates management tables associated with the respective attributes. Attribute-dependent sorting order determining means determines sorting orders suited to the respective attributes of the management tables and sets values of sorting order indexes associated with respective character strings in the management tables. Sorting means compares the character strings of each attribute with each other, and determines a sorting order of character strings with an identical attribute in accordance with the values of the sorting order indexes, to carry out sorting.

15 Claims, 18 Drawing Sheets

| SORTED ACCORDING TO CHARACTER CODES | SORTED WITH CASE & SIZE NON-DISCRIMINATED |
|---|---|
| ABC | ABC |
| BBB | A B C |
| CCC | abc |
| abc | BBB |
| bdf | bdf |
| A B C | CCC |

FIG. 4

| SORTING BY CHARACTER CODES | ARITHMETIC SORTING |
|---|---|
| 1<br>1 0<br>1 0 0<br>2<br>2 1 | 1<br>2<br>1 0<br>2 1<br>1 0 0 |

FIG. 5

| MANAGE-MENT NO. | CHARACTER STRING |
|---|---|
| 1 | 2 "MAN" "EN" |
| 2 | 1 "MAN" "EN" |
| 3 | 1 0"MAN""EN" |
| 4 | A1 |
| 5 | a1 |
| 6 | A 1 |
| 7 | a 1 |

"MAN" = 万
"EN" = 円

FIG. 8

| MANAGEMENT NO. | NUMERIC CHARACTER ATTRIBUTE | DIVISION ORDER | SORTING ORDER INDEX |
|---|---|---|---|
| 1 | 2 | 1 | |
| 2 | 1 | 1 | |
| 3 | 10 | 1 | |
| 4 | 1 | 2 | |
| 5 | 1 | 2 | |
| 6 | 1 | 2 | |
| 7 | 1 | 2 | |

FIG. 9

| MANAGEMENT NO. | ALPHABETIC CHARACTER ATTRIBUTE | DIVISION ORDER | SORTING ORDER INDEX |
|---|---|---|---|
| 1 | | | |
| 2 | | | |
| 3 | | | |
| 4 | A | 1 | |
| 5 | a | 1 | |
| 6 | A | 1 | |
| 7 | a | 1 | |

FIG. 10

| MANAGEMENT NO. | KANJI CHARACTER ATTRIBUTE | DIVISION ORDER | SORTING ORDER INDEX |
|---|---|---|---|
| 1 | "MAN" "EN" | 2 | |
| 2 | "MAN" "EN" | 2 | |
| 3 | "MAN" "EN" | 2 | |
| 4 | | | |
| 5 | | | |
| 6 | | | |
| 7 | | | |

FIG. 11

| MANAGEMENT NO. | NUMERIC CHARACTER ATTRIBUTE | DIVISION ORDER | SORTING ORDER INDEX |
|---|---|---|---|
| 1 | 2 | 1 | 3 |
| 2 | 1 | 1 | 2 |
| 3 | 10 | 1 | 4 |
| 4 | 1 | 2 | 1 |
| 5 | 1 | 2 | 1 |
| 6 | 1 | 2 | 2 |
| 7 | 1 | 2 | 2 |

FIG. 13

| MANAGEMENT NO. | ALPHABETIC CHARACTER ATTRIBUTE | DIVISION ORDER | SORTING ORDER INDEX |
|---|---|---|---|
| 1 | | | 1 |
| 2 | | | 1 |
| 3 | | | 1 |
| 4 | A | 1 | 2 |
| 5 | a | 1 | 4 |
| 6 | A | 1 | 3 |
| 7 | a | 1 | 5 |

FIG. 14

| MANAGEMENT NO. | KANJI CHARACTER ATTRIBUTE | DIVISION ORDER | SORTING ORDER INDEX |
|---|---|---|---|
| 1 | "MAN" "EN" | 2 | 2 |
| 2 | "MAN" "EN" | 2 | 2 |
| 3 | "MAN" "EN" | 2 | 2 |
| 4 | | | 1 |
| 5 | | | 1 |
| 6 | | | 1 |
| 7 | | | 1 |

FIG. 15

| MANAGEMENT NO. | NUMERIC CHARACTER ATTRIBUTE | | ALPHABETIC CHARACTER ATTRIBUTE | | KANJI CHARACTER ATTRIBUTE | | RESULT |
|---|---|---|---|---|---|---|---|
| | DIVISION ORDER | SORTING ORDER | DIVISION ORDER | SORTING ORDER | DIVISION ORDER | SORTING ORDER | |
| 1 | 1 | 3 | | 1 | 2 | 2 | 2 |
| 2 | 1 | 2 | | 1 | 2 | 2 | 1 |
| 3 | 1 | 4 | | 1 | 2 | 2 | 3 |
| 4 | 2 | 1 | 1 | 2 | | 1 | 4 |
| 5 | 2 | 1 | 1 | 4 | | 1 | 6 |
| 6 | 2 | 2 | 1 | 3 | | 1 | 5 |
| 7 | 2 | 2 | 1 | 5 | | 1 | 7 |

FIG. 16

| MANAGE-MENT NO. | CHARACTER STRING |
|---|---|
| 2 | 1 "MAN" "EN" |
| 1 | 2 "MAN" "EN" |
| 3 | 1 0 "MAN" "EN" |
| 4 | A1 |
| 6 | A 1 |
| 5 | a1 |
| 7 | a 1 |

FIG. 17

| MANAGE-MENT NO. | CHARACTER STRING |
|---|---|
| 2 | 1 "MAN" "EN" |
| 4 | A1 |
| 6 | A 1 |
| 5 | a1 |
| 7 | a 1 |
| 1 | 2 "MAN" "EN" |
| 3 | 1 0"MAN" "EN" |

FIG. 18

APPARATUS AND METHOD FOR SORTING ATTRIBUTES-MIXED CHARACTER STRINGS

BACKGROUND OF THE INVENTION (1) Field of the Invention

The present invention relates to an apparatus and method for sorting character strings composed of characters with different attributes, and more particularly, to an apparatus and method for sorting attributes-mixed character strings wherein an improved means is provided for determining the order of sorting individual character strings.

(2) Description of the Related Art

Computers designed to perform a variety of data processing have databases which are a collection of integrated files for use in various ways. By creating a database, it is possible to avoid duplication of data among files and also to permit files to be closely interrelated with each other. In many cases, a special system is provided for exclusively carrying out the database management.

Data dealt with in a database include those composed of a plurality of character strings, and characters are handled by means of character codes. The character codes are a set of standardized codes for converting binary data to characters. The term "characters" used herein represent all characters including symbols and the like besides letters and numbers.

When searching for data in a database, data are rearranged in such an order as to facilitate the process needed, because a large number of records written in a certain format must be handled. Rearranging data according to a certain rule is called sorting.

Conventionally, when sorting character strings, first, the character codes of the characters at the beginning of the individual character strings are compared with one another. In the case of sorting in ascending order, character strings are rearranged such that a character string of which the head character has a smaller character code value comes first, and in the case of sorting in descending order, character strings are rearranged such that a character string of which the head character has a greater character code value appears first. If the characters codes compared have the same value, the code values of subsequent characters are compared with each other. In this manner, all character strings can be sorted.

Character strings to be sorted, however, include characters with various attributes. The attributes include numeric character, alphabetic character, "Kana" character, "Kanji" character, etc. Since in conventional methods character strings are sorted according to their character codes alone despite a diversity of attributes, the sorting order is in some cases inappropriate.

For example, the numeric character "2" has a greater character code value than "1"; therefore, when the character strings "10" and "2" are compared with each other, the character code of "1" is compared with that of "2". Consequently, it is judged that "2" has a greater value and thus is greater than "10". When the character strings are to be treated as numerical values for arithmetic purposes, however, the judgment that "2" is greater than "10" is not proper at all.

A sorting method may be employed in which individual characters are treated as numeric characters for arithmetic operation, but such a method cannot be applied to the case where characters with other different attributes coexist. For example, "A10" and "A2" cannot be subjected to arithmetic sorting, because "A" is not a numeric character.

Also, alphabetic letters consist of uppercase characters ("A" to "Z") and lowercase characters ("a" to "z"), and these uppercase and lowercase characters, when sorted according to their character codes, are treated as entirely different characters. Accordingly, if the three alphanumeric strings "A2", "a1" and "B" are sorted in ascending order, they are rearranged in the order of "A2", "B" and "a1". However, in dictionaries or in indexes to books, the strings are shown in the order of "a1", "A2" and "B", since an uppercase letter and its corresponding lowercase letter are regarded as characters of the same order. Thus, if characters with the same significance are indicated in different ways, they are regarded as entirely different characters, and the order of sorted data becomes different from the commonly accepted order. In the following, a pair of different characters having the same attribute and significance (but different character codes), such as "A" and "a", are called "kindred characters."

The relation of kindred characters can also be found between full-size characters (16-bit characters) and half-size characters (8-bit characters) and between "Hiragana" and "Katakana" of the Kana characters.

Thus, although characters of the individual attributes have respective different orders for better sorting, in conventional methods characters of all attributes are sorted according to an identical rule, posing a problem in that character strings are sorted in an inappropriate order.

SUMMARY OF THE INVENTION

An object of the present invention is to provide an apparatus for sorting attributes-mixed character strings whereby character strings can be sorted according to the attributes of characters in an order suited to the significance of individual characters.

Another object of the present invention is to provide a method of sorting attributes-mixed character strings by which character strings can be sorted according to the attributes of characters in an order suited to the significance of individual characters.

To achieve the above objects, there is provided a sorting apparatus for sorting character strings composed of characters with different attributes. The sorting apparatus comprises dividing means for dividing character strings to be sorted in a database according to attributes and creating management tables associated with the respective attributes, attribute-dependent sorting order determining means for determining sorting orders suited to the respective attributes of the management tables and setting values of sorting order indexes associated with respective character strings in the management tables, and sorting means for comparing the character strings of each attribute with each other, and determining a sorting order of character strings with an identical attribute in accordance with the values of the sorting order indexes, to carry out sorting.

To achieve the above objects, there is also provided a method of sorting character strings composed of characters with different attributes. The sorting method comprises dividing character strings to be sorted according to attributes, determining sorting orders suited to the respective attributes, comparing the character strings of each attribute with each other, and determining a sorting order of character strings with an identical attribute in accordance with the determined sorting order, to carry out sorting.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a chart showing an example of sorting in which no discrimination is made between full-size characters and half-size characters and between uppercase characters and lowercase characters;

FIG. 5 is a chart showing an example of arithmetic sorting;

FIG. 8 is a chart showing, by way of example, character strings to be sorted;

FIG. 9 is a chart illustrating a management table for numeric character attribute;

FIG. 10 is a chart illustrating a management table for alphabetic character attribute;

FIG. 11 is a chart illustrating a management table for Kanji character attribute;

FIG. 13 is a chart illustrating the management table for the numeric character attribute after the determination of sorting order;

FIG. 14 is a chart illustrating the management table for the alphabetic character attribute after the determination of sorting order;

FIG. 15 is a chart illustrating the management table for the Kanji character attribute after the determination of sorting order;

FIG. 16 is a chart showing a result of sorting order determination in which no sorting order preference is specified;

FIG. 17 is a chart showing a result of sorting in which no sorting order preference is specified; and FIG. 18 is a chart showing a result of sorting in which the numeric character attribute is specified as a preferential attribute.

DESCRIPTION OF THE PREFERRED EMBODIMENTS

An embodiment according to the present invention will be outlined first.

To solve the problem described above, the present invention provides a sorting apparatus for sorting character strings composed of characters with different attributes, the sorting apparatus comprising dividing means 12 for dividing character strings to be sorted in a database 11 according to attributes and creating management tables 14a, 14b and 14c associated with the respective attributes, attribute-dependent sorting order determining means 13 for determining sorting orders suited to the respective attributes of the management tables 14a, 14b and 14c and setting values of sorting order indexes associated with respective character strings in the management tables 14a, 14b and 14c, and sorting means 15 for comparing the character strings of each attribute with each other, and determining a sorting order of character strings with an identical attribute in accordance with the values of the sorting order indexes, to carry out sorting.

Also provided is a method of sorting character strings composed of characters with different attributes, the method comprising dividing character strings to be sorted in the database 11 according to attributes, determining attribute-dependent sorting orders suited to the respective attributes, comparing the character strings of each attribute with each other, and determining a sorting order of character strings with an identical attribute in accordance with the determined attribute-dependent sorting order, to carry out sorting.

The dividing means 12 divides character strings to be sorted in the database 11 according to the attributes, and creates the management tables 14a, 14b and 14c associated with the respective attributes. The attribute-dependent sorting order determining means 13 determines a sorting order suited to the attribute of each of the management tables 14a, 14b and 14c, and sets values of the sorting order indexes associated with respective character strings in the management tables 14a, 14b and 14c. The sorting means 15 compares the character strings of each attribute with each other, and determines the sorting order of character strings with an identical attribute in accordance with the values of the sorting order indexes, to carry out sorting.

The character strings to be sorted in the database are divided according to the attributes, and attribute-dependent sorting orders suited to the respective attributes are determined. When carrying out sorting, the character strings of each attribute are compared with each other, and the sorting order of character strings with an identical attribute is determined in accordance with the determined attribute-dependent sorting order, to carry out sorting.

Accordingly, even in the case where character strings contain a plurality of attributes, they can be sorted in an order suited to the individual attributes.

The embodiment of the present invention will be now described in detail.

Figure 1:
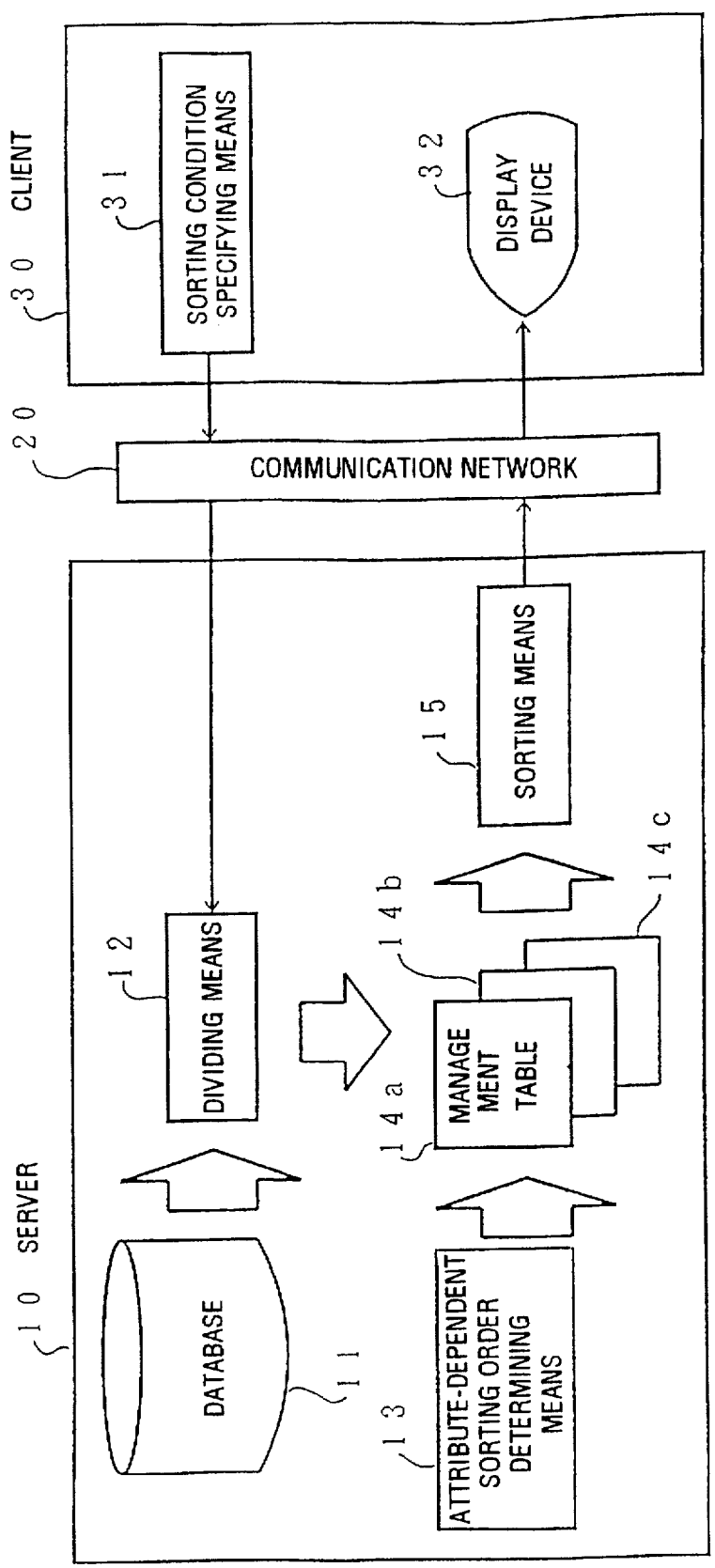
FIG. 1 is a diagram illustrating the principles of an apparatus for sorting attributes-mixed character strings according to the present invention.

FIG. 1 illustrates the principles of a sorting apparatus for sorting attributes-mixed character strings according to the present invention. The illustrated configuration is generally divided into a server 10 and a client 30 interconnected by a communication network 20. The server 10 is a computer system for providing a variety of data via the communication network 20. The client 30 is an apparatus operated directly by an operator to manipulate data in the server 10 through the communication network 20 and to display the result of data handling. For the communication network 20, a local-area network such as TCP/IP (Transmission Control Protocol) is used.

Sorting condition specifying means 31 in the client 30 specifies various conditions, such as a condition as to whether or not half-size characters should be discriminated from full-size characters, a condition as to whether or not among Kana characters, Hiragana characters should be discriminated from Katakana characters, and a condition as to whether or not among alphabetic characters, uppercase characters should be discriminated from lowercase characters. The criteria according to which character attributes are discriminated from each other are called sort levels. A specific attribute that is to be preferentially used during sorting can also be specified, if necessary.

The database 11 in the server 10 stores character strings to be sorted. When supplied with a character string sort request, the dividing means 12 divides all of the character strings to be sorted in the database 11 according to attribute separation levels as specified by the sorting condition specifying means 31, thus dividing the character strings according to the attributes. The attributes thus separated are each associated with a division order which indicates the order or position of the attribute concerned in the character string. The dividing means 12 then creates the management tables 14a, 14b and 14c for the respective attributes.

The attribute-dependent sorting order determining means 13 determines sorting orders for the respective attributes, and affixes sorting order data to the individual sorting order indexes in each of the management tables 14a, 14b and 14c. In this case, arithmetic sorting is performed on numerical values. The arithmetic sorting denotes a sorting method in which the sorting order is determined by comparing the quantities of numerical values indicated by the character strings.

The sorting means 15 carries out sorting by comparing the attributes of character strings with each other from the beginning thereof. In this case, as the criterion for the comparison, the order of numeric character, alphabetic character, Kana character and Kanji character is preferentially employed, and for characters of the same attribute, the order is determined by the values of the sorting order indexes. If a preferential attribute has been specified for the sorting, the division orders of such attribute are given preference, and for identical division orders of the same attribute, a sorting order index with a smaller value is given preference.

The result of the sorting is sent to the client 30 via the communication network 20 and displayed at a display device 32 in the client 30.

Character strings for which the order cannot be determined on the given sorting conditions are sorted in the order in which they are stored in the database 11.

Figure 2:
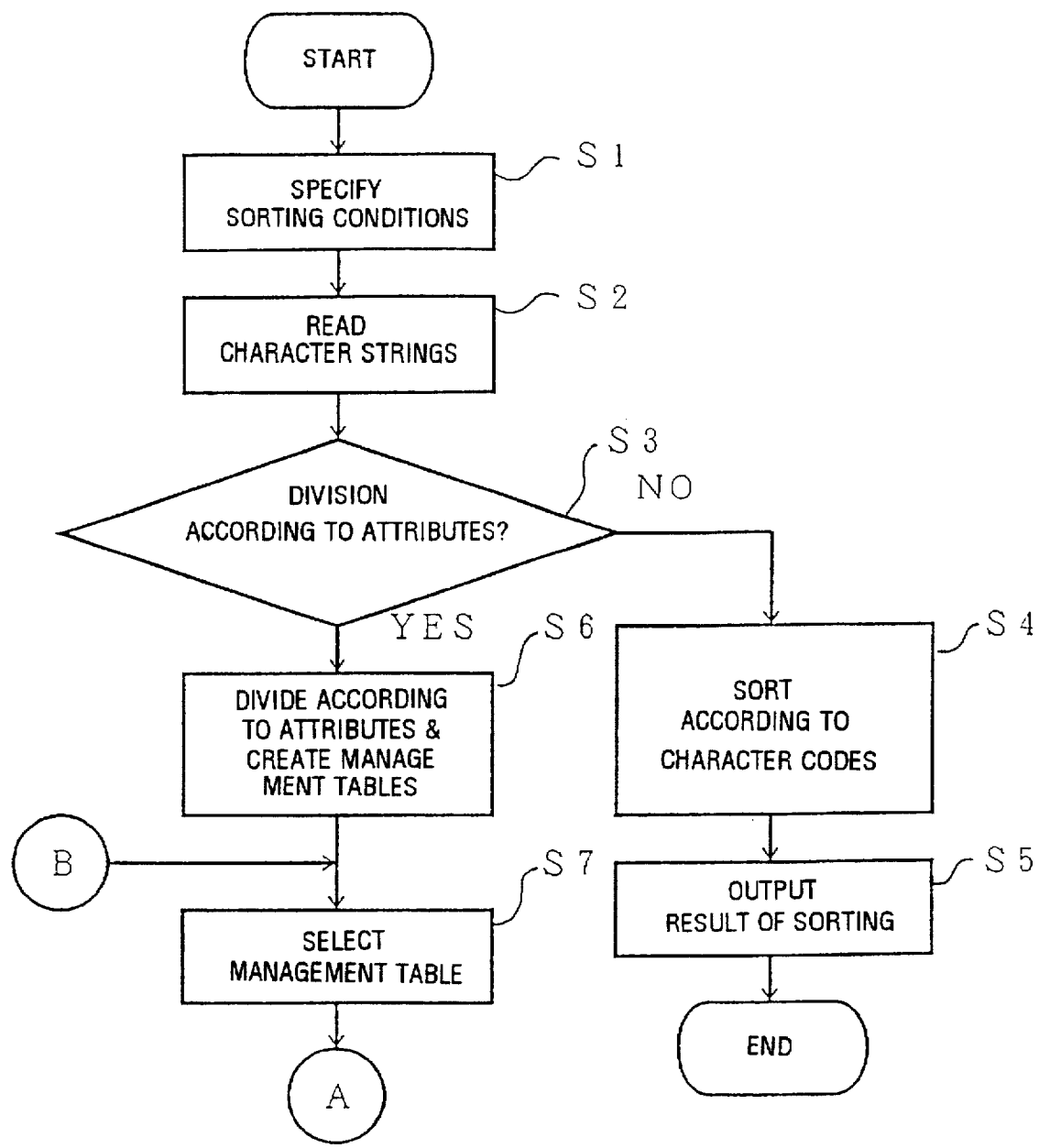
FIG. 2 is a flowchart showing the former half of a process for sorting attributes-mixed character strings according to a method of the present invention.

FIG. 2 is a flowchart showing the former half of a process for sorting attributes-mixed character strings according to a method of the present invention.

[S1] Sorting conditions are specified by the sorting condition specifying means 31.

[S2] Character strings in the database 11 are read.

[S3] It is determined whether the sort request requires division according to the attributes. If division according to the attributes is required, the flow proceeds to Step 6; if not, the flow proceeds to Step 4. Namely, if division according to the attributes is not required, the character strings are sorted according to the character codes of individual characters, in a manner known in the art.

[S4] The character strings are sorted according to the character codes of the individual characters.

[S5] At the client 30, the result of the sorting is output to the display device 32, followed by termination of the process.

[S6] The dividing means 12 divides each of the character strings according to the attributes, and creates management tables associated with the respective attributes.

Figure 3:
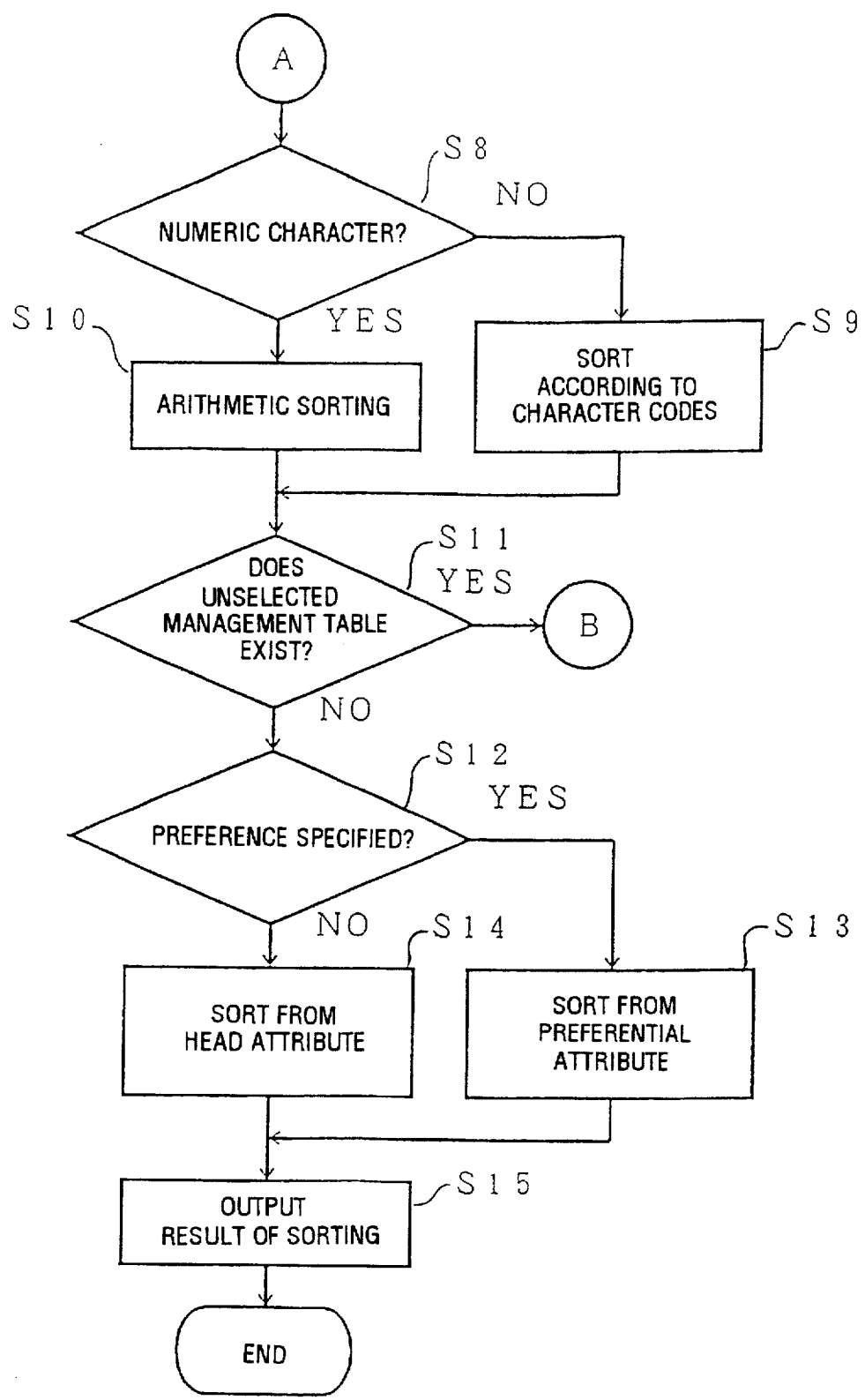
FIG. 3 is a flowchart showing the latter half of the process for sorting attributes-mixed character strings according to the method of the present invention.

[S7] One of the management tables of which the sorting order indexes have no data affixed thereto is selected (the flow then proceeds to Step 8 in FIG. 3). Step 7 through Step 11 in FIG. 3 correspond to the function achieved by the attribute-dependent sorting order determining means 13.

FIG. 3 is a flowchart showing the latter half of the process for sorting attributes-mixed character strings according to the method of the present invention.

[S8] It is determined whether the character attribute of the selected management table is numeric character. If the character attribute is numeric character, the flow proceeds to Step 10, and if not, the flow proceeds to Step 9.

[S9] The sorting order for the characters in the management table is determined, and the values derived are written in the respective sorting order indexes of the management table. The sorting order determined in this case is in accordance with character codes; however, in cases where the sort level discrimination is disabled by the sort level settings, kindred characters, for example, "A" and "a", are assigned the same order.

[S10] The sorting order for the characters in the management table is determined by the arithmetic sorting, and the values derived are written in the respective sorting order indexes of the management table.

[S11] It is determined whether there is any management table which has no values set in the sorting order indexes thereof. If such a management table exists, the flow returns to Step 7; if not, the flow proceeds to Step S12.

[S12] It is determined whether any preferential attribute has been specified by the sorting preference settings. If any preferential attribute has been set, the flow proceeds to Step 13; if not, the flow proceeds to Step 14. Steps 12 through 14 correspond to the function achieved by the sorting means.

[S13] The character strings with the preferential attribute are compared and sorted. In this case, a character string with a higher division order is given preference, and if the division orders are the same, the values of the sorting order indexes are compared with each other. If character strings have the same sorting order, characters of other attributes with higher division order are successively compared. In this case, attribute preferences are in the order of numeric character, alphabetic character, Kana character and Kanji character if ascending order has been specified. The attribute preferences are in the reverse order in the case of descending order.

[S14] The character strings are sorted by successively comparing the attributes from the beginning thereof. In the case of sorting in ascending order, the attribute preferences are in the order of numeric character, alphabetic character, Kana character and Kanji character. In the case of sorting in descending order, the attribute preferences are in the reverse order. For character strings with the same attribute, the order is determined by the values of the sorting order indexes.

[S15] The result of the sorting is sent to the client 30 and output to the display device 32.

In this manner, the sorting order can be determined for the individual attributes, and kindred characters with the same attribute can be sorted as identical characters while numeric characters can be subjected to the arithmetic sorting.

The following explains, by way of example, the case wherein kindred characters with the same attribute are sorted as identical characters.

FIG. 4 illustrates an example of sorting in which no discrimination is made between full-size and half-size characters and between uppercase and lowercase characters of the alphabetic letters. The left-hand side of the chart illustrates the case of sorting with the character attributes discriminated, and the right-hand side of the chart illustrates the case of sorting with the character attributes non-discriminated.

In the case where full-size characters are discriminated from half-size characters and uppercase characters are discriminated from lowercase characters, the character strings are sorted merely according to the character codes in the order of half-size uppercase character, half-size lowercase character, full-size uppercase character, and so forth. Where no discrimination is made between full-size and half-size characters and between uppercase and lowercase characters, kindred characters are assigned as the same sorting order, that is, the character strings are sorted in alphabetical order.

The arithmetic sorting will be now explained.

FIG. 5 illustrates an example of the arithmetic sorting. The left-hand side of the chart illustrates a result of sorting according to the character codes, and the right-hand side of the chart illustrates a result of the arithmetic sorting.

In the case of sorting by the character codes, character strings are sorted by successively comparing the numeric characters from the beginning thereof. In the case of the arithmetic sorting, numeric character strings are regarded as numerical values for arithmetic operation and thus are sorted in ascending order of value.

A procedure for carrying out sorting by a system having the configuration as shown in FIG. 1 will be now explained in detail.

First, sorting conditions are specified by the sorting condition specifying means 31. Sorting conditions can be easily specified by displaying a sorting condition specifying screen at the display device 32 of the client 30 and then selecting required conditions on various menus with a mouse.

Figure 6:
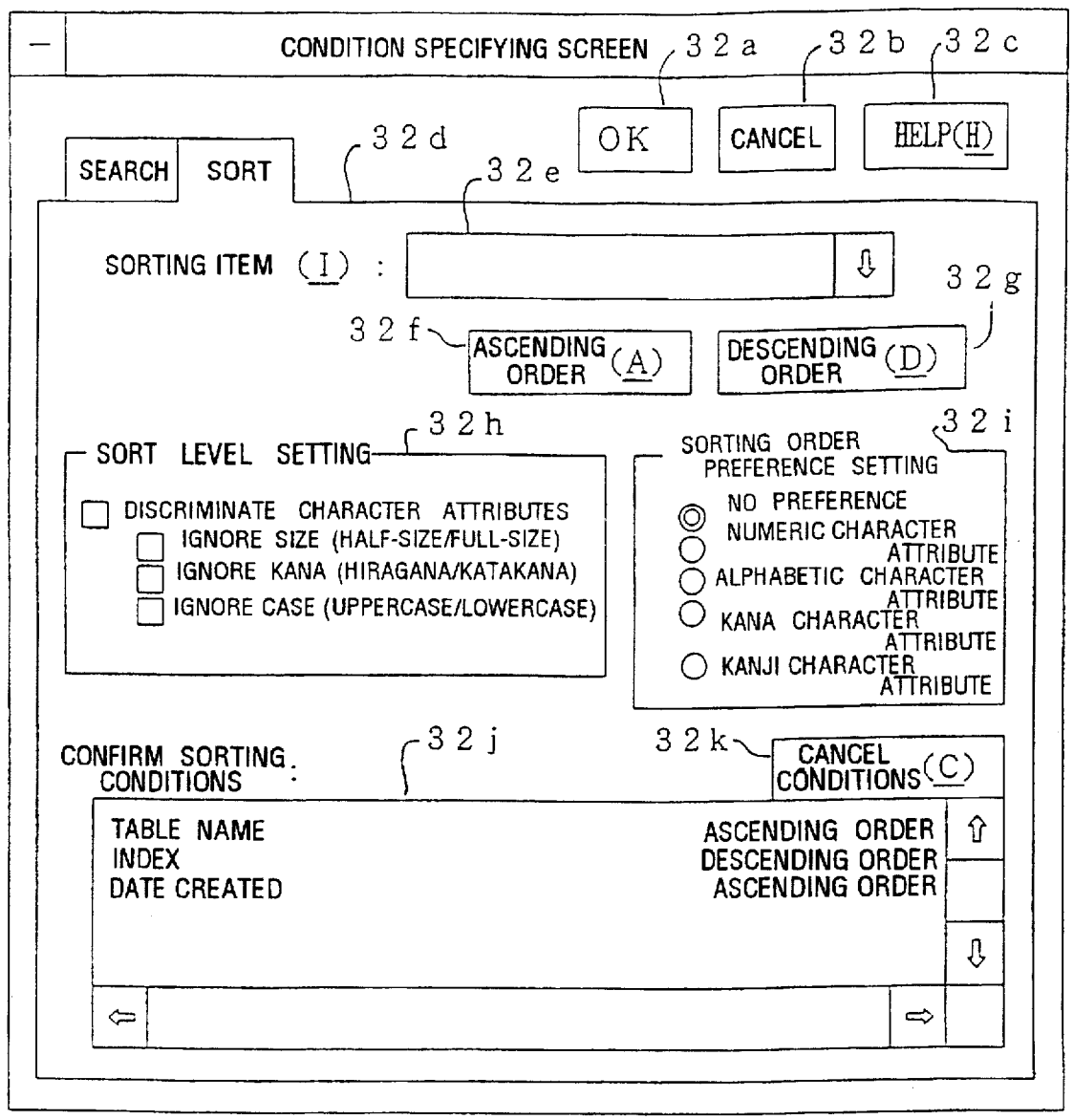
FIG. 6 is a diagram showing a sorting condition specifying screen.

FIG. 6 illustrates the sorting condition specifying screen. In the center of the sorting condition specifying screen is shown a condition specifying item display section 32d, and three control keys "OK" 32a, "CANCEL" 32b, and "HELP" 32c are displayed above the display section 32d. The control key "OK" 32a is used when all conditions have been specified. When the control key "OK" 32a is selected, the specified conditions are transferred to the server 10. The control key "CANCEL" 32b is used to cancel the output of a sort command. The control key "HELP" 32c, when selected, displays messages explaining how to make settings on this screen, in case the operator does not know how to operate on this screen. The functions of these control keys can be executed by moving the mouse pointer to a desired control key and then clicking the button of the mouse. Various keys described below also can be selected with the mouse to specify various items or to execute set functions.

In the upper part of the condition specifying item display section 32d is located a sorting item display section 32e in which a table name to be sorted is displayed. Below the sorting item display section 32e are an ascending order select key 32f and a descending order select key 32g. The ascending order select key 32f is used when sorting characters in ascending order of code value or when sorting numeric characters in ascending order for the arithmetic sorting. The descending order select key 32g is used when sorting characters in descending order of code value or when sorting numeric characters in descending order for the arithmetic sorting.

Below the keys 32f and 32g are a sort level specifying section 32h and a sorting order preference specifying section 32i. The sort level specifying section 32h is used to set a level of discrimination at which the attributes are to be discriminated. Specifically, in this section 32h are specified whether or not half-size characters should be discriminated from full-size characters; for the Kana characters, whether or not Hiragana characters should be discriminated from Katakana characters; and for the alphabetic characters, whether or not uppercase characters should be discriminated from lowercase characters. The sorting order preference specifying section 32i is used to specify an attribute which is to be preferentially applied during the sorting, and one of the five items "No Preference", "Numeric Character Attribute", "Alphabetic Character Attribute", "Kana Character Attribute", and "Kanji Character Attribute" is selected.

At the bottom of the display section 32d is a sorting condition confirmation section 32j. In this sorting condition confirmation section 32j, the sorting condition set for each of the sorting items is displayed. A condition cancel key 32k, which is located above the upper right corner of the sorting condition confirmation section 32j, is used to cancel the set conditions.

The sorting conditions specified on the sorting condition specifying screen are transferred to the dividing means 12.

The data specified in the sort level specifying section 32h are set at respective bits of a sort level setting flag.

Figure 7:
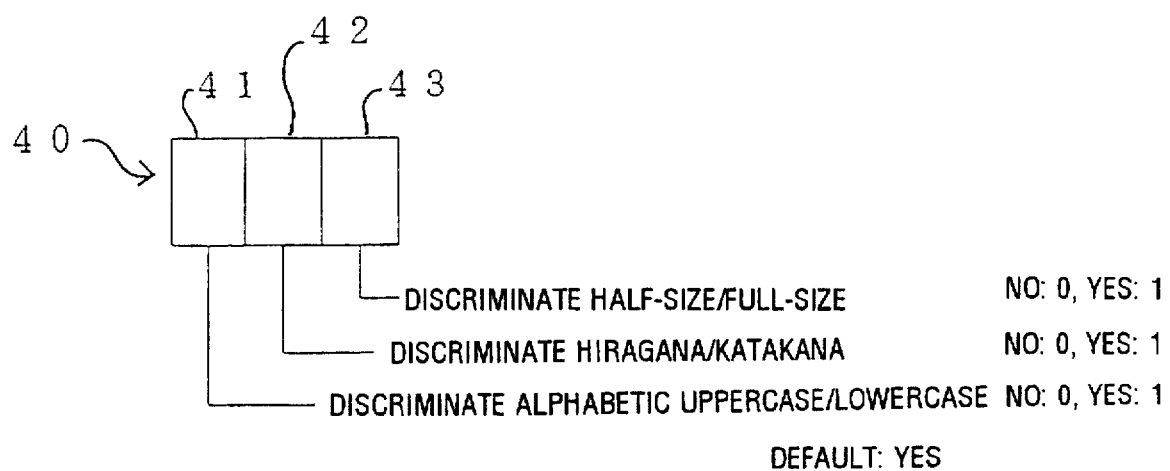
FIG. 7 is a diagram showing a sort level setting flag.

FIG. 7 illustrates the sort level setting flag. The sort level setting flag 40 consists of three flag bits 41, 42 and 43. The first flag bit 41 is used to indicate whether or not discrimination is to be made between uppercase and lowercase characters of the alphabetic letters; "1" is set to enable the discrimination and "0" is set to disable the discrimination. The second flag bit 42 is used to indicate whether or not discrimination is to be made between Hiragana and Katakana of the Kana characters; "1" is set to enable the discrimination and "0" is set to disable the discrimination. The third flag bit 43 is used to indicate whether or not discrimination is to be made between half-size and full-size characters; "1" is set to enable the discrimination and "0" is set to disable the discrimination. When these settings are omitted, "1" (enable discrimination) is set at the individual bits (by default).

In accordance with the specified conditions, the dividing means 12 divides each of character strings according to the attributes and creates management tables associated with the respective attributes. Examples of the management tables containing character strings will be explained.

FIG. 8 shows an example of a set of character strings to be sorted. The character strings are assigned the management numbers "1" to "7", respectively, and comprise "2 MAN" "EN"" ("MAN" is a character with the Kanji Attribute which means 'ten thousand', and "EN" is a character with the Kanji Attribute which means 'yen' in Japanese.), "1 "MAN" "EN"", "10 "MAN" "EN"", "A1", "a1", "A1", and "a1" in the order of management number. Among these character strings, those at the management numbers 4 and 5 are composed of half-size characters. It is here assumed that the sorting conditions prescribe that the character strings should be sorted in ascending order with the discrimination of all attributes disabled by the sort level settings and with no sorting order preference.

The management tables are created in the order of numeric character attribute, alphabetic character attribute and Kanji character attribute. In the illustrated example, the character strings to be sorted do not include Kana characters, and thus no management table is created for the Kana characters. If, however, Kana characters are included, a management table for Kana characters is created after the management table for alphabetic characters is created.

FIG. 9 illustrates a management table for the numeric character attribute. The management table includes four items for each character string, that is, the management number, numeric character attribute, division order, and sorting order index associated with each character string. Under the item "NUMERIC CHARACTER ATTRIBUTE", the characters with the numeric attribute in the corresponding character string are recorded.

Under "DIVISION ORDER" is recorded an attribute order or position on which the numeric character attribute falls in the corresponding character string. Specifically, in the character strings at the management numbers 1 to 3 in FIG. 8, the numeric character attribute appears first in the corresponding character string, and thus "1" is recorded as the division order. In the character strings at the management numbers 4 to 7, the alphabetic character attribute appears first and precedes the subsequent numeric character attribute; therefore, "2" is recorded as the division order. In this case, even if the numeric character is preceded by two alphabetic characters, the division order of the numeric character attribute remains the same, because the alphabetic characters have the same attribute. If, however, the numeric character is preceded by alphabetic and Kanji characters, then the division order of the numeric character attribute becomes "3".

No values are set under the item "SORTING ORDER INDEX". At this stage, areas for setting the sorting order indexes are reserved.

FIG. 10 illustrates a management table associated with the alphabetic character attribute. The management table includes four items for each character string, that is, the management number, alphabetic character attribute, division order, and sorting order index associated with each character string. Under the item "ALPHABETIC CHARACTER ATTRIBUTE", the character with the alphabetic attribute in the corresponding character string is recorded. The items "DIVISION ORDER" and "SORTING ORDER INDEX" are identical to the corresponding ones shown in FIG. 9.

FIG. 11 illustrates a management table associated with the Kanji character attribute. The management table includes four items for each character string, that is, the management number, Kanji character attribute, division order, and sorting order index associated with each character string. Under the item "KANJI CHARACTER ATTRIBUTE", the characters with the Kanji attribute in the corresponding character string are recorded. The items "DIVISION ORDER" and "SORTING ORDER INDEX" are identical to the corresponding ones shown in FIG. 9.

The aforementioned management tables are each associated with a character attribute flag so that when sort level discrimination is to be made, individual bits of the character attribute flag may indicate which management tables are associated with which attributes.

Figure 12:
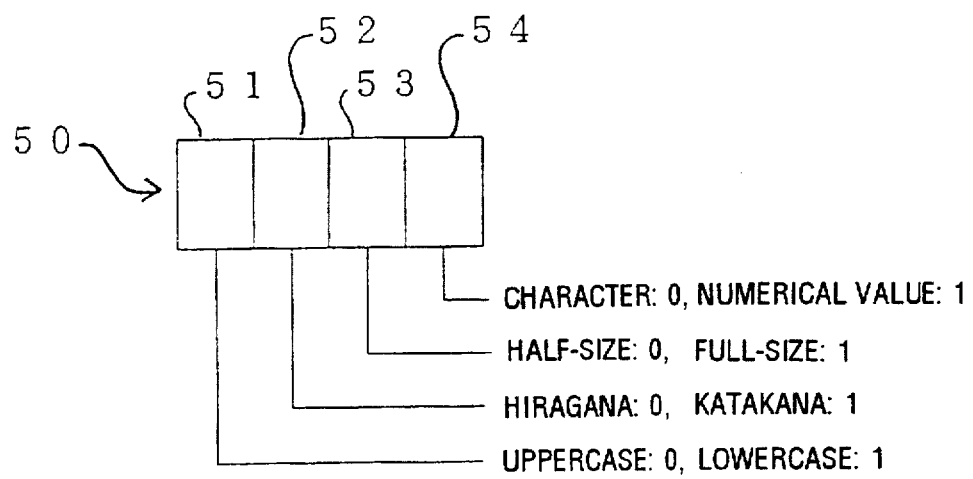
FIG. 12 is a diagram showing a character attribute flag.

FIG. 12 illustrates the character attribute flag. The character attribute flag 50 consists of four flag bits 51, 52, 53 and 54. The first flag bit 51 is used to discriminate between uppercase and lowercase characters of the alphabetic letters; "0" is set if the characters in the management table are uppercase characters, and "1" is set if the characters are lowercase characters. This flag bit 51 is valid only when discrimination between uppercase and lowercase characters is to be made.

The second flag bit 52 is used to discriminate between Hiragana and Katakana of the Kana characters; "0" is set if the characters in the management table are Hiragana characters, and "1" is set if the characters are Katakana characters. This flag bit 52 is valid only when discrimination between Hiragana and Katakana characters is to be made.

The third flag bit 53 is used to discriminate between full-size and half-size characters; "0" is set if the characters in the management table are half-size characters, and "1" is set if the characters are full-size characters. This flag bit 53 is valid only when discrimination between half-size and full-size characters is to be made.

The last flag bit 54 is used to determine whether the characters are numeric characters or other characters; "0" is set if the characters in the management table are characters other than numeric characters, and "1" is set if the characters are numeric characters.

The attribute-dependent sorting order determining means 13 determines the values of the sorting order indexes in each of the management tables created as described above. The values of the sorting order indexes, determined for each management table, are recorded under the item "SORTING ORDER INDEX". In this case, for characters other than numeric characters, the values of the sorting order indexes are determined by their character codes, while numeric characters are subjected to the arithmetic sorting. For kindred characters among half-size and full-size characters, half-size character is given preference; for kindred characters among alphabetic uppercase and lowercase letters, uppercase character is given preference; and for kindred characters among Hiragana and Katakana characters, Hiragana character is given preference. A character string containing no such attribute is given top preference and thus comes first.

FIG. 13 illustrates the management table for the numeric character attribute after the determination of sorting order. The illustrated management table is similar to that shown in FIG. 9 except that the values of sorting order indexes are recorded. Since this table is associated with the numeric character attribute, the arithmetic sorting is performed. There are two types of "1", that is, the full-size character "1" and the half-size character "1"; therefore, the sorting order index values are assigned in the order of half size "1", full-size "1", "2", and "10".

FIG. 14 illustrates the management table for the alphabetic character attribute after the determination of sorting order. The illustrated management table is similar to that shown in FIG. 10 except that the values of sorting order indexes are recorded. Since the character strings at the management numbers 1 to 3 contain no alphabetic characters, they are given top preference during the sorting. Between the uppercase and lowercase characters of an identical alphabetic letter, uppercase character is given preference, and between the half-size and full-size characters of an identical alphabetic uppercase letter, half-size character is given preference. This applies to the case of the half-size and full-size characters of an identical alphabetic lowercase letter. Consequently, character strings containing no alphabetic character attribute are given top preference, and the other character strings are sorted in the order of half-size uppercase "A", full-size uppercase "A", half-size lowercase "a", and full-size lowercase "a".

FIG. 15 illustrates the management table for the Kanji character attribute after the determination of sorting order. The illustrated management table is similar to that shown in FIG. 11 except that the values of sorting order indexes are recorded. Since the character strings at the management numbers 4 to 7 include no Kanji characters, they are given top preference during the sorting. Consequently, character strings containing no Kanji character attribute are given top preference, and those containing ""MAN" "EN"" follow. For different Kanji characters, the sorting order is determined by the values of their character codes.

The sorting means 15 analyzes the management tables to carry out the sorting. In this case, if no sorting order preference is set, first, the characters with the division order "1" in the character strings are compared with each other, and the character strings are sorted in the order of numeric character, alphabetic character, Kana character, and Kanji character. For characters with the same attribute, comparison is made using the values of the sorting order indexes set in the management table. If characters with the division order "1" have the same sorting order, characters with the division order "2" are compared with each other.

FIG. 16 shows the result of sorting order determination wherein no sorting order preference is specified. The sorting order is determined based on the management tables shown in FIGS. 9 to 11. As seen from the figure, the character strings (management Nos. 1–3) with the numeric attribute and the division order "1" are compared with each other by their sorting order index values, and are respectively assigned the sorting orders "1" to "3". Then, the character strings (management Nos. 4–7) with the alphabetic attribute and the division order "1" are compared with each other by their sorting order index values, and are respectively assigned the sorting orders "4" to "7".

FIG. 17 shows a result of sorting wherein no sorting order preference is specified. As a result of sorting, the character strings are rearranged in the order of "1 "MAN" "EN"", "2 "MAN" "EN"", "10 "MAN" "EN"", "A1", "A1", "a1", and "a1", since no sorting order preference is specified. If sorting order preference is set with respect to a certain attribute, the sorting order is determined based on the characters having such preferential attribute, and for identical characters, the character with a higher division order is given preference.

FIG. 18 shows a result of sorting wherein sorting order preference is set with respect to the numeric character attribute. In this example, no discrimination is made between full-size and half-size characters. As a result of sorting, the character strings are rearranged in the order of "1 "MAN" "EN"", "A1", "A1", "a1", "a1", "2 "MAN" "EN"", and "10 "MAN" "EN"".

In this case, the numeric characters in the individual character strings are first compared with each other. Since the numeric characters are treated as numerical values, their quantities, and not their character codes, are compared with each other. As a result, the character strings (management Nos. 2, 4–7) having the numerical value "1" come a top, followed by the character string (management No. 1) having the numerical value "2" and then by the character string (management No. 3) having the numerical value "10".

Among the character strings (management Nos. 2, 4–7) having the numerical value "1", a character string with a higher division order is given preference. Accordingly, the character string (management No. 2) having the division order "1" comes first, and the character strings (management Nos. 4–7) having the division order "2" follow. The character strings at the management Nos. 4 to 7 have the same order when compared by their numerical values, and thus are compared with each other by their alphabetic characters.

In this manner, character strings composed of characters with different attributes can be sorted in an order suited to the individual attributes. Further, by setting an attribute discrimination level by means of sort level settings, it is possible to specify whether or not discrimination is to be made between kindred characters of a desired attribute.

In the case where sorting order preference is set, a desired attribute can be given top preference as the criterion for sorting.

Although, in the foregoing description, the result of sorting is displayed at the display device, it may be stored in the form of a file in a storage device such as a hard disk.

As described above, according to the present invention, character strings composed of characters with different attributes are divided according to the attributes, sorting orders are determined for the respective attributes, and using the sorting orders as the criteria, characters of the individual attributes are compared with each other. Accordingly, it is possible to determine the sorting order suited to the significance of characters of the individual attributes, and even character strings containing a variety of attributes can be sorted in a proper order.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A sorting apparatus, comprising:
   storing means for storing character strings composed of characters with different attributes, the attributes defining properties of the characters and enabling the characters to be categorized into groups in different ways;
   dividing means for separating each of the character strings into a plurality of substrings according to the attributes, and creating management tables associated with the respective attributes to store the substrings;
   attribute-dependent sorting order determining means for determining a sorting order of the character strings for each type of attribute associated with each of the management tables, and determining setting values of sorting order indexes associated with the respective substrings of the character strings stored in the management tables; and
   sorting means for sorting the character strings according to predetermined priorities of the attributes, using the values of the sorting order indexes in the management tables for sorting the character strings with an identical attribute.

2. The sorting apparatus according to claim 1, wherein said attribute-dependent sorting order determining means performs arithmetic sorting on character strings with a numeric character attribute.

3. The sorting apparatus according to claim 1, wherein said attribute-dependent sorting order determining means assigns an identical order to characters having an identical attribute and identical significance when determining the sorting order.

4. The sorting apparatus according to claim 1, wherein, when a preferential attribute is set as a criterion for preferential sorting, said sorting means gives preference to a character string of which the preferential attribute has a higher order of the division, and for character strings of which the preferential attributes have an identical order of the division, said sorting means determines the sorting order by the values of the sorting order indexes.

5. The sorting apparatus according to claim 1, which further comprises sorting condition specifying means for specifying sorting conditions for the respective attributes to be applied when the character strings are divided.

6. The sorting apparatus according to claim 5, wherein said sorting condition specifying means specifies levels of division to be applied when the attributes are separated.

7. The sorting apparatus according to claim 5, wherein said sorting condition specifying means is capable of specifying a desired one of the attributes as a preferential attribute which is used as a preferential criterion during the sorting.

8. The sorting apparatus according to claim 5, wherein said sorting condition specifying means is provided in a client apparatus connected the sorting apparatus via a communication network.

9. The sorting apparatus according to claim 1, which further comprises a display device for displaying results of sorting.

10. The sorting apparatus according to claim 9, wherein said display device is provided in a client apparatus connected to the sorting apparatus via a communication network.

11. A method of sorting character strings, comprising the steps of:

storing character strings composed of characters with different attributes, the attributes defining properties of the characters and enabling the characters to be categorized into groups in different ways dividing each of the character strings into a plurality of substrings according to the attributes of the characters;

determining a sorting order of the character strings separately for each type of the attributes, by evaluating the substrings of the character strings; and sorting the character strings according to predetermined priorities of the attributes, using the determined sorting order for sorting the character strings with an identical attribute.

12. The method according to claim 11, wherein character strings with a numeric character attribute are subjected to arithmetic sorting when determining the sorting order.

13. The method according to claim 11, wherein an identical order is assigned to characters having an identical attribute and identical significance when determining the sorting order.

14. A method of sorting character strings, comprising the steps of:

storing character strings in a database, wherein each character string is composed of characters, each character has an attribute, and each character string has one or more attributes dividing a first character string into portions, each portion containing adjacent characters having the same attribute;

creating a management table corresponding to each attribute;

setting values of sorting order indexes for each management table based on a sorting order for said attribute; and sorting the character strings according to the sorting order indexes in each management table and preferential attributes settings.

15. A method of sorting character strings, comprising the steps of:

storing character strings, wherein each character string includes characters, each character has a respective attribute, and each character string has one or more respective attributes;

dividing each of said character strings into portions according to their respective attributes;

sorting said character strings by sorting each of said portions according to a sorting order for each of said attributes.

* * * * *

UNITED STATES PATENT AND TRADEMARK OFFICE
CERTIFICATE OF CORRECTION

PATENT NO. :  5,799,303

DATED :  August 25, 1998

INVENTOR(S) :
Tsuchimura

It is certified that error appears in the above-indentified patent and that said Letters Patent is hereby corrected as shown below:

Col. 14, line 26, after "attributes;" insert --and--.

Signed and Sealed this

Sixteenth Day of February, 1999

Attest:

Attesting Officer

Acting Commissioner of Patents and Trademarks